(12) United States Patent  (10) Patent No.: US 8,379,423 B2
Park et al.  (45) Date of Patent: Feb. 19, 2013

(54) POWER FACTOR CORRECTION CIRCUIT AND DRIVING METHOD THEREOF

(75) Inventors: Young-Bae Park, Anyang (KR); Sang Cheol Moon, Bucheon (KR); Byoung-Heon Kim, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 319 days.

(21) Appl. No.: 12/912,481

(22) Filed: Oct. 26, 2010

(65) Prior Publication Data

US 2011/0102950 A1 May 5, 2011

(30) Foreign Application Priority Data

Oct. 29, 2009 (KR) .................. 10-2009-0103640

(51) Int. Cl.
*H02M 5/42* (2006.01)
*H02M 7/04* (2006.01)
*G05F 1/00* (2006.01)
(52) U.S. Cl. ........... 363/89; 323/222; 323/284; 323/285
(58) Field of Classification Search .................. 363/84, 363/89
See application file for complete search history.

(56) References Cited

U.S. PATENT DOCUMENTS

| | | | |
|---|---|---|---|
| 5,818,707 A * | 10/1998 | Seong et al. | 363/89 |
| 6,847,195 B2 * | 1/2005 | Chen | 323/222 |
| 7,031,173 B2 * | 4/2006 | Feldtkeller | 363/89 |
| 7,397,678 B2 * | 7/2008 | Frank et al. | 363/89 |
| 7,898,237 B2 * | 3/2011 | Shao et al. | 323/285 |
| 8,098,505 B1 * | 1/2012 | Choi | 363/89 |

* cited by examiner

*Primary Examiner* — Dharti Patel
(74) *Attorney, Agent, or Firm* — Okamoto & Benedicto LLP

(57) ABSTRACT

The present invention relates to a power factor correction circuit and a driving method thereof.
The power factor correction circuit includes: an inductor for receiving an input voltage and supplying output power; a power switch connected to the inductor to control an inductor current flowing through the inductor; an auxiliary conductor coupled to the inductor with a predetermined turn ratio; and a power factor correction controller that controls the output power by controlling the switching operation of the power switch and determines whether or not the output voltage of the output power is an over-voltage. The power factor correction controller generates an input peak voltage corresponding to the peak of the input voltage by using a clamping current for maintaining an auxiliary voltage, which is the both-end voltage of the auxiliary inductor, at a predetermined clamping voltage during the turn-on period of the power switch so as to prevent the auxiliary voltage from becoming a negative voltage, generates a duty voltage corresponding to the duty of the power switch, and determines whether or not the output voltage is an over-voltage according to a result of comparison between the input peak voltage and the duty voltage.

21 Claims, 4 Drawing Sheets

POWER FACTOR CORRECTION CIRCUIT AND DRIVING METHOD THEREOF

CROSS-REFERENCE TO RELATED APPLICATION

This application claims priority to and the benefit of Korean Patent Application No. 10-2009-0103640 filed in the Korean Intellectual Property Office on Oct. 29, 2009, the entire contents of which are incorporated herein by reference.

BACKGROUND OF THE INVENTION (a) Field of the Invention

The present invention relates to a power factor correction circuit and a driving method thereof.

(b) Description of the Related Art

A control circuit of a typical power factor correction circuit (hereinafter, a power factor correction control circuit) receives a feedback voltage corresponding to an output voltage, and controls the output voltage according to the feedback voltage so as to keep the output voltage constant.

However, the output voltage may become an over-voltage because the control response of the power factor correction control circuit is very slow. To prevent this, the power factor correction control circuit includes an over-voltage protection function of determining that an output voltage is an over-voltage if a feedback voltage is above a predetermined voltage. At this time, a resistor element is used to divide the output voltage in order to adjust the feedback voltage within a voltage range suitable for the power factor correction control circuit. Since the resistor element is used for voltage division, a very large resistor is used to reduce power consumption caused by the resistor. At this point, if the resistance value is changed due to damage to the resistor element or the resistor element is damaged and cut off, the feedback voltage does not correspond to the output voltage, and a significant difference is generated between information about the actual output voltage and information about the output voltage delivered to the power factor correction control circuit. Moreover, a bulk capacitor connected to the output terminal of the power factor correction circuit and storing an output voltage has a fairly large capacitance. If the bulk capacitor is damaged due to over-voltage, the capacitor may explode and cause a loud noise. This is quite a large disadvantage from a user's perspective.

To avoid this, a method of preventing over-voltage by additionally connecting a resistor element to an output terminal may be used. However, this causes an increase in production costs due to increase in power consumption and expense of additional parts.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the aforementioned problems and provide a power factor correction circuit, which can detect an over-voltage of an output voltage without detecting the output voltage using a resistor element, and a driving method thereof.

A power factor correction circuit according to one aspect of the present invention includes an inductor, a power switch, an auxiliary conductor, and a power factor correction controller. The inductor receives an input voltage and supplies an output power, and the power switch is connected to the inductor to control an inductor current flowing through the inductor. The auxiliary inductor is coupled to the inductor with a predetermined turn ratio, and the power factor correction controller controls the output power by controlling the switching operation of the power switch and determines whether or not the output voltage of the output power is an over-voltage. The power factor correction controller includes an over-voltage protector that generates an input peak voltage corresponding to the peak of the input voltage by using a clamping current for maintaining a zero current detection voltage corresponding to an auxiliary voltage, which is the both-end voltage of the auxiliary inductor, at a predetermined clamping voltage, generates a duty voltage corresponding to the duty of the power switch, and determines whether or not the output voltage is an over-voltage according to a result of comparison between the input peak voltage and the duty voltage. The power factor correction controller generates the input peak voltage by using the clamping current obtained during the turn-on period of the power switch.

The over-voltage protector according to one aspect of the present invention includes: an input peak voltage generator that generates an input detection voltage corresponding to the clamping current, samples and holds the peak of the input detection voltage in a cycle of the input detection voltage, and adjusts the held peak voltage according to a predetermined gain to generate the input peak voltage; a duty voltage generator that receives a predetermined control signal for controlling the duty, generates a variable duty voltage that increases or decreases in response to the control signal, and samples and holds the peak of the variable duty voltage to generate the held voltage as the duty voltage; and a protection comparator that includes a first input terminal for receiving the input peak voltage and a second input terminal for receiving the duty voltage and generates an over-voltage protection signal according to a result of comparison between the input peak voltage and the duty voltage. The input peak voltage generator includes: a current detector for detecting the clamping current; a current mirror for mirroring the detected current and generating a mirror current; a resistor through which the mirror current flows to produce the input detection voltage; an input peak sample/holder for sampling and holding the peak of the input detection voltage in a cycle of the input detection voltage to generate the peak voltage; and a peak adjuster for adjusting the peak voltage according to the gain to generate an input peak voltage. The gain is determined by the ratio between an input detection voltage obtained when the input voltage is at the peak and a duty voltage obtained when the output voltage is a reference voltage of over-voltage detection.

The duty voltage generator according to one aspect of the present invention includes: a variable duty voltage generator that includes a duty capacitor and generates the variable duty voltage by discharging the duty capacitor in response to a control signal for turning on the power switch and charging the duty capacitor in response to a control signal for turning off the power switch; and a duty sample/holder for sampling and holding the peak of the variable duty voltage in a cycle of the control signal to generate the duty voltage. The variable duty voltage generator includes: a first resistor with one end connected to one end of the duty capacitor; a duty charge switch with one end connected to the other end of the first resistor and the other end supplied with a predetermined reference voltage; a second resistor with one end connected to one end of the duty capacitor; a duty discharge switch with one end connected to the other end of the second resistor and the other end being grounded; an inverter for receiving the control signal and inverting and outputting the control signal; and a reset switch with one end connected to one end of the duty capacitor and the other end receiving the reference voltage, wherein the duty discharge switch performs a switching operation in response to the control signal and the duty charge switch performs a switching operation in response to the inverted control signal.

The power factor correction controller according to one aspect of the present invention further includes a PWM controller that turns on the power switch if the zero current detection voltage is lower than a predetermined reference voltage, and turns off the power switch according to a result of comparison between an error amplification signal corresponding to the output voltage and a ramp signal that increases at a constant slope during the turn-on period of the power switch. The PWM controller includes: a PWM comparator for comparing the error amplification signal and the ramp signal and generating a comparison result signal according to a result of the comparison; a logical operator for generating an OFF control signal in response to the comparison result signal and the over-voltage protection signal; an ON controller for generating an ON control signal if the zero current detection voltage is the reference voltage or lower; a PWM flip-flop that includes a set terminal for receiving the ON control signal and a reset terminal for receiving the OFF control signal, and generates a gate driver control signal of a first level for turning on the power switch in response to the ON control signal and a gate driver control signal of a second level for turning off the power switch in response to the OFF control signal; and a gate driver that generates a gate control signal for switching the power switch in response to the gate driver control signal. The duty voltage generator receives any one of the ON control signal, the OFF control signal, and the gate driver control signal instead of the gate control signal, and generates a variable duty voltage. The logical operator receives an inverted signal of the over-voltage protection signal and the comparison result signal and generates the OFF control signal by performing an OR operation.

The power factor correction circuit according to one aspect of the present invention further includes an error amplifier for amplifying the difference between a predetermined error reference voltage and a division voltage obtained by resistor-dividing the output voltage to generate the error amplification signal.

The power factor correction circuit according to one aspect of the present invention further includes a ramp signal generator including: a constant current source for generating a constant current; a charge switch with one end connected to the constant current source; a capacitor with one end connected to the other end of the charge switch and the other end being grounded; and a discharge switch connected in parallel to the capacitor, wherein the charge switch is turned on during the turn-on period of the power switch, the discharge switch is turned off during the turn-off period of the power switch, and the ramp signal is the voltage of one end of the capacitor.

The power factor correction controller according to one aspect of the present invention further includes: a transistor including an emitter for receiving the zero current detection voltage and a collector to which a bias voltage is applied; a serial diode string including at least one diode disposed between the base of the transistor and the ground; and a clamping unit including a constant current source for supplying a constant current to the serial diode string, wherein the clamping current is a current flowing through the transistor. The serial diode string includes diodes of a number determined according to the clamping voltage. The over-voltage protector includes: an input peak voltage generator that generates an input detection voltage corresponding to the clamping current, samples and holds the peak of the input detection voltage in a cycle of the input detection voltage, and adjusts the held peak voltage according to a predetermined gain to generate the input peak voltage; a duty voltage generator that receives a predetermined control signal for controlling the duty, generates a variable duty voltage that increases or decreases in response to the control signal, and samples and holds the peak of the variable duty voltage to generate the held voltage as the duty voltage; and a protection comparator that includes a first input terminal for receiving the input peak voltage and a second input terminal for receiving the duty voltage and generates an over-voltage protection signal according to a result of comparison between the input peak voltage and the duty voltage.

A power factor correction circuit operating according to a driving method according to another aspect of the present invention includes: an inductor for receiving an input voltage and supplying an output power; a power switch connected to the inductor to control an inductor current flowing through the inductor; and an auxiliary inductor coupled to the inductor with a predetermined turn ratio. The driving method of the power factor correction circuit includes: detecting a clamping current for maintaining a zero current detection voltage corresponding to an auxiliary voltage, which is the both-end voltage of the auxiliary inductor, at a predetermined clamping voltage; generating an input peak voltage corresponding to the peak of the input voltage by using the detected clamping current; generating a duty voltage corresponding to the duty of the power switch; and determining whether or not the output voltage is an over-voltage according to a result of comparison between the input peak voltage and the duty voltage. The detecting of the clamping current is performed during the turn-on period of the power switch.

The generating of the input peak voltage includes: generating an input detection voltage corresponding to the clamping current; sampling and holding the peak of the input detection voltage in a cycle of the input detection voltage; and adjusting the held peak voltage according to a predetermined gain to generate the input peak voltage. The gain is determined by the ratio between an input detection voltage obtained when the input voltage is at the peak and a duty voltage obtained when the output voltage is a reference voltage of over-voltage detection.

The generating of the duty voltage includes: receiving a predetermined control signal for controlling the duty and generating a variable duty voltage that increases or decreases in response to the control signal; and sampling and holding the peak of the variable duty voltage to generate the held voltage as the duty voltage.

According to the present invention, there is provided a power factor correction circuit that can determine whether or not an output voltage is an over-voltage without directly detecting the output voltage, and a driving method thereof. In comparison with the prior art that detects an output voltage using a resistor element, power consumption is reduced.

DETAILED DESCRIPTION OF THE EMBODIMENTS

Figure 1:
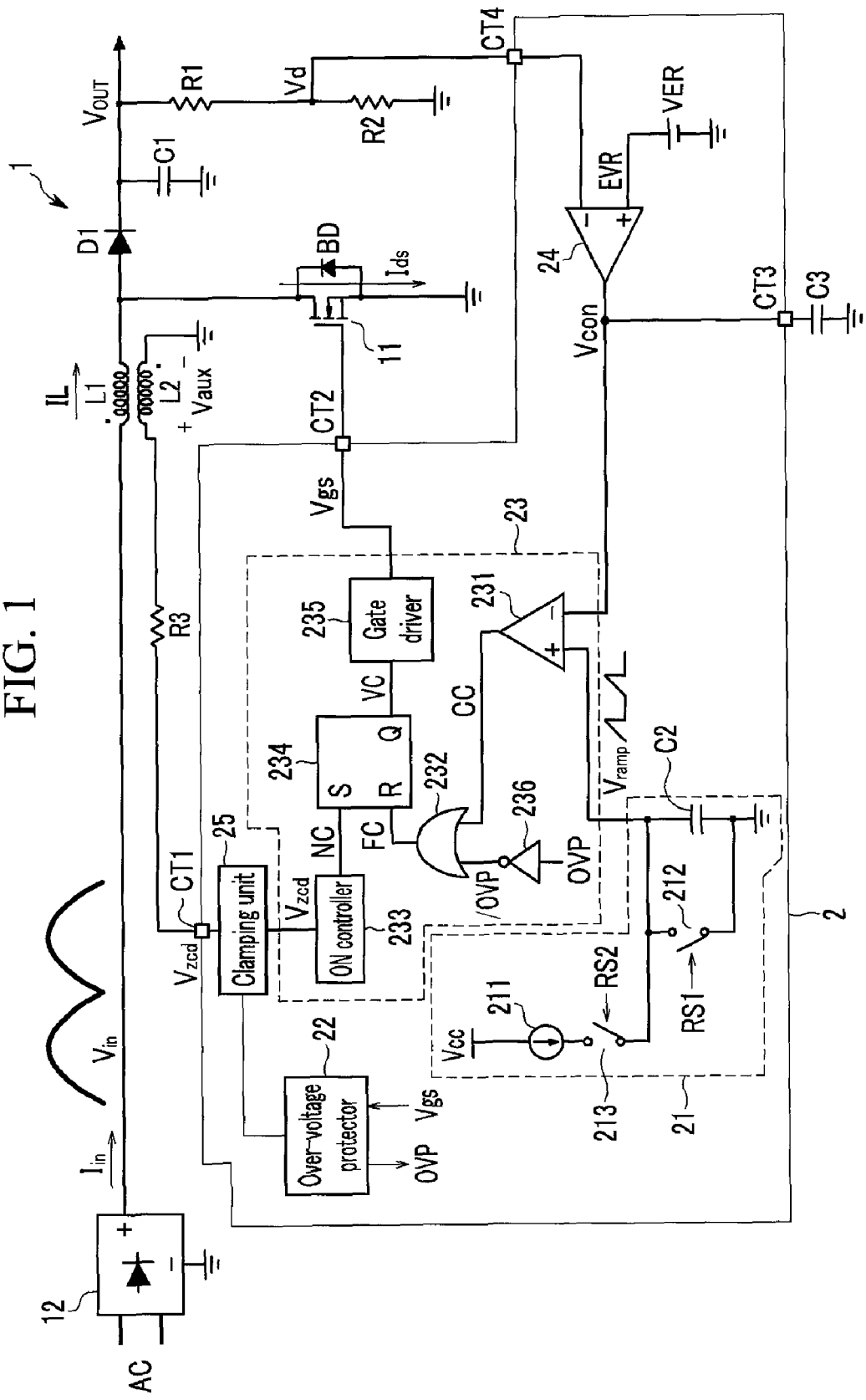
FIG. 1 is a view showing a power factor correction circuit according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a view showing a power factor correction circuit 1 according to an exemplary embodiment of the present invention.

As shown in FIG. 1, the power factor correction circuit 1 includes a power factor correction controller 2, a power switch 11, a bridge diode 12, a diode D1, a capacitor C1, an inductor L1, an auxiliary inductor L2, and divider resistors R1 and R2. The power switch 11 according to an exemplary embodiment of the present invention includes an n-channel metal oxide semiconductor field effect transistor (NMOS-FET). A body diode BD is formed between the drain and source electrodes of the power switch 11. A current flowing through the power switch 11 is hereinafter referred to as a "drain current (Ids)".

The bridge diode 12 is formed of four diodes (not shown), and generates an input voltage Vin by performing full-wave rectification on an input alternating current AC.

The input voltage Vin is supplied to one end of the inductor L1, and the other end of the inductor L1 is connected to the anode of the diode D1. An input current Iin viewed from the bridge diode 12 is the average value of inductor current IL that increases or decreases according to the switching operation of the power switch 11, which is a full-wave rectified sine wave. The drain electrode of the power switch 11 is connected to the anode of the diode D1 and the other end of the inductor L1.

The inductor L1 receives the input voltage Vin and generates output power. The inductor current IL flowing through the inductor L1 is controlled by the switching operation of the power switch 11. An inductor current is a triangular waveform that repeatedly increases/decreases. The inductor current increases during the turn-on period of the power switch 11, and decreases during the turn-off period of the power switch 11. Concretely, during the turn-on period of the power switch 11, the inductor L1 stores energy as the inductor current IL increases. During the turn-off period of the power switch 11, the energy stored in the inductor L1 is transferred to the output terminal of the power factor correction circuit 1 as the inductor current IL flows through the diode D1. When the power switch 11 is turned off and the diode D1 is conducted, the inductor current IL flows to a load connected to the output terminal of the power factor correction circuit 1 and charges the capacitor C1. The larger the load connected to the output terminal of the power factor correction circuit 1, the higher the inductor current IL supplied to the load. Therefore, a current flowing to the capacitor C1 becomes relatively smaller, thus making an output voltage Vout relatively lower. In contrast, the smaller the load, the smaller the inductor current IL supplied to the load. Therefore, the current flowing to the capacitor C1 becomes relatively larger, thus making the output voltage Vout higher.

When the power switch 11 is turned on, the diode D1 is disconnected and the inductor current IL flows through the power switch 11. The power factor correction controller 2 generates an error amplification signal Vcon using a division voltage Vd obtained by dividing the output voltage Vout by the resistor ratio R2/(R1+R2) between the divider resistors R1 and R2, and determines a point of time when the power switch 11 is turned off by comparing the error amplification signal Vcon and a ramp signal Vramp having a predetermined cycle. A point of time when the power switch 11 is turned on is determined according to a zero current detection voltage Vzcd corresponding to a voltage of the auxiliary inductor L2 (hereinafter referred to as an auxiliary voltage Vaux). The auxiliary inductor L2 is coupled to the inductor L1 with a predetermined turn ratio (turns of the auxiliary inductor L2/turns of the inductor L1). A voltage obtained by multiplying the both-end voltage of the inductor L1 by the turn ratio is the both-end voltage of the auxiliary inductor L2, and a current obtained by dividing the inductor current IL by the turn ratio flows in the auxiliary inductor L2. The auxiliary inductor L2 is used to supply a power supply voltage to the power factor correction control circuit 2 or detect a point at which the inductor current IL reaches zero.

In the present invention, peak information of the input voltage Vin is detected using the auxiliary voltage Vaux in order to determine whether or not the output voltage Vout is an over-voltage. Also, in the present invention, it is determined whether or not the output voltage Vout is an over-voltage by using the peak and duty information of the input voltage Vin. The auxiliary voltage Vaux differs depending on the conductive state, input voltage Vin, output voltage Vout, and turn ratio of the power switch 11.

Figure 2A:
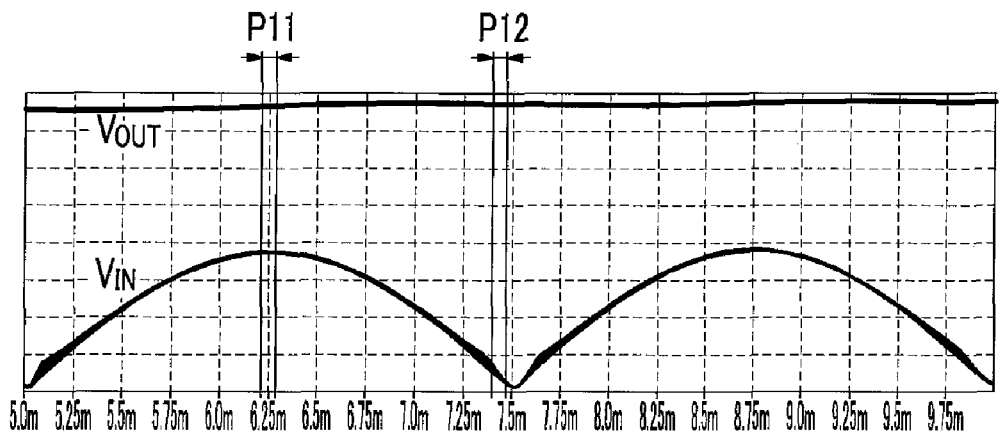
FIG. 2A is a view showing the waveforms of an input voltage Vin and an output voltage Vin.

FIG. 2A is a view showing the waveforms of the input voltage Vin and the output voltage Vin.

Figure 2B:
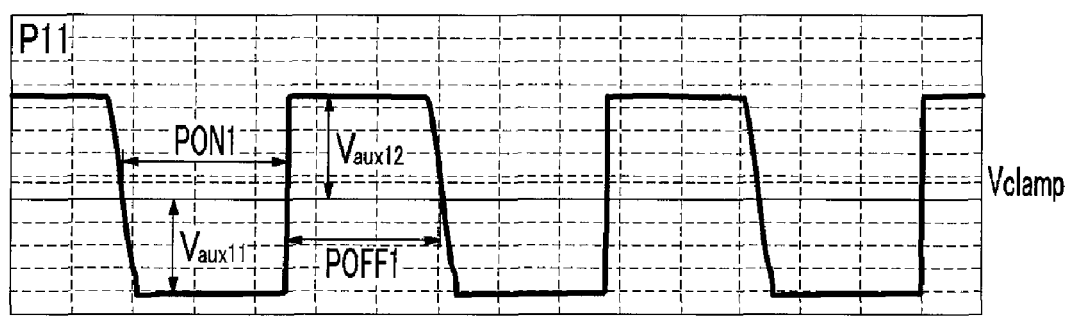
FIG. 2B is a view showing the waveform of an auxiliary voltage Vaux during a first period P11 including a point of time when the input voltage Vin is at its peak.
Figure 2C:
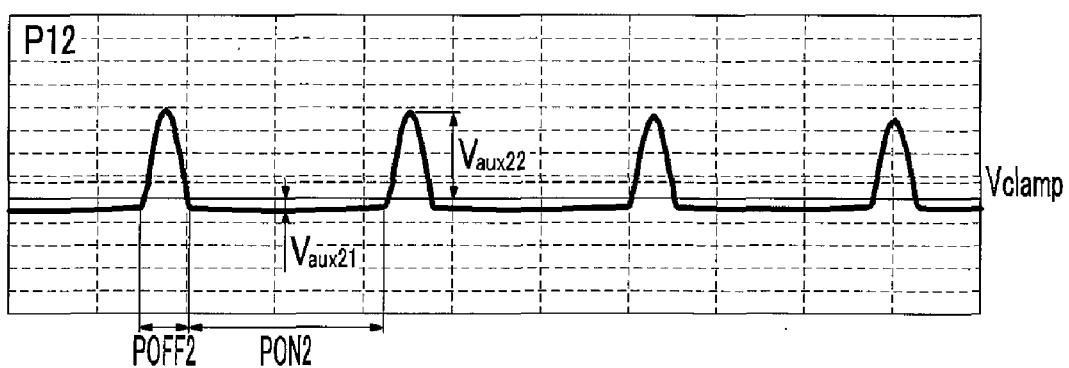
FIG. 2C is a view showing the waveform of the auxiliary voltage Vaux during a second period P12 when the input voltage Vin is close to the ground voltage.

FIG. 2B is a view showing the waveform of the auxiliary voltage Vaux during a first period P11 including a point of time when the input voltage Vin is at its peak. FIG. 2C is a view showing the waveform of the auxiliary voltage Vaux during a second period P12 when the input voltage Vin is close to the ground voltage.

The auxiliary voltage Vaux can be represented by Equations 1 and 2 by using the input voltage Vin, the output voltage Vout, and the turn ratio Naux/Nin between the inductor L1(Nin) and the auxiliary inductor L2(Naux). Equation 1 represents the auxiliary voltage Vaux when the power switch 11 is turned off, and Equation 2 represents the auxiliary voltage Vaux when the power switch 11 is turned on.

$$Vaux = (Naux/Nin)(Vout - Vin) \quad \text{(Equation 1)}$$

$$Vaux = -(Naux/Nin)Vin \quad \text{(Equation 2)}$$

As shown in FIGS. 2B and 2C, the auxiliary voltage Vaux is a negative voltage during the turn-on periods PON1 and PON2 of the power switch 11, and the auxiliary voltage Vaux is a positive voltage during the turn-off periods POFF1 and POFF2 of the power switch 11. With the power switch 11 turned on, the higher the input voltage Vin, the higher the absolute value of the auxiliary voltage Vaux.

The power factor correction control circuit 2 receives a zero current detection voltage Vzcd through a connection terminal CT1. It is not preferable for a negative voltage to be input to an actual IC that implements the power factor correction control circuit 2. Generally, the negative voltage induces stress on the IC. In an exemplary embodiment of the present invention, if the auxiliary voltage Vaux is a negative voltage, the auxiliary voltage Vaux is increased to a clamping voltage Vclamp which is a predetermined positive voltage. Accordingly, the lowest value of an actual zero current detection voltage Vzcd is the clamping voltage Vclamp. In an exemplary embodiment of the present invention, a current is supplied to the resistor R3 in order to raise the zero current detection voltage Vzcd to the clamping voltage Vclamp. When the auxiliary voltage Vaux is a negative voltage, the higher the absolute value thereof, the higher the current that is required. As mentioned above, the absolute value of the auxiliary voltage Vaux is proportional to the input voltage Vin. Thus, the higher the input voltage Vin, the higher the current that is required to increase the zero current detection voltage Vzcd to the clamping voltage Vclamp during the turn-on period of the power switch 11. A concrete description thereof will be given later with reference to FIG. 3.

Since an exemplary embodiment of the present invention involves a boundary conduction mode power factor correction circuit, when the power switch 11 is turned off and the inductor current IL reaches zero, resonance is induced between the inductor L1 and the parasitic capacitor (not shown) of the power switch 11. Then, the voltage of the inductor L1 decreases in a sine-wave form, the auxiliary voltage Vaux decreases, and the zero current detection voltage Vzcd, decreases as well. When the zero current detection voltage Vzcd starts to decrease, the power factor correction controller 2 detects that the inductor current IL reaches zero and turns on the power switch 11 after a predetermined delay period. Concretely, when the zero current detection voltage Vzcd starts to decrease and reaches a predetermined ON reference voltage, the power switch 11 is turned on. Hereinafter, the power factor correction controller 2 will be described in detail.

The power factor correction controller 2 includes a ramp signal generator 21, an over-voltage protector 22, a PWM controller 23, an error amplifier 24, and a clamping unit 25.

The error amplifier 24 amplifies a difference between an error reference voltage EVR of a reference voltage source VER and a division voltage Vd to generate an error amplification signal Vcon. The capacitor C3 is connected to the output end of the error amplifier 24. The error amplification signal Vcon is amplified with a predetermined gain through the capacitor C3, and is controlled and corrected by being delayed for a predetermined period. The error amplifier 24 includes an inverting terminal (−) for receiving a division voltage Vd through a connection terminal CT4 and a non-inverting terminal (+) for receiving the error reference voltage EVR. The capacitor C3 is connected to the output end of the error amplifier 24 through a connection terminal CT3, and is located outside the power factor correction controller 2.

The ramp signal generator 21 generates an increasing ramp signal Vramp having a predetermined slope during the turn-on period of the power switch 11. The ramp signal generator 21 includes a constant current source 211, a discharge switch 212, a charge switch 213, and a capacitor C2. One end of the charge switch 213 is connected to one end of the constant current source 211, and the other end of the charge switch 213 is connected to one end of each of the discharge switch 212 and the capacitor C2. The discharge switch 212 and the capacitor C2 are connected in parallel, and the other end of each of the discharge switch 212 and the capacitor C2 are grounded. During the turn-on period of the power switch 11, the charge switch 213 is turned on by a switching signal RS2, and the discharge switch 212 is turned off by a switching signal RS1. Then, the current of the constant current source 211 charges the capacitor C2, and thus the ramp signal Vramp increases at a slope corresponding to the current of the constant current source 211. During the turn-off period of the power switch 11, the charge switch 213 is turned off by the switching signal RS2, and the discharge switch 212 is turned on by the switching signal RS1. Then, the current of the constant current source 211 is cut off and the capacitor C2 is discharged, and thus the ramp signal Vramp is quickly discharged and then becomes the ground voltage.

The PWM controller 23 generates a gate control signal Vgs to control the switching operation of the power switch 11 by using the zero current detection voltage Vzcd, the ramp signal Vramp, and the error amplification signal Vcon. The PWM controller 23 includes a PWM comparator 231, an OR gate 232, an ON controller 233, a PWM flip-flop 234, a gate driver 235, and an inverter 236.

The PWM comparator 231 compares the ramp signal Vramp and the error amplification signal Vcon and generates a comparison result signal CC. The PWM comparator 231 includes a non-inverting terminal (+) for receiving the ramp signal Vramp and an inverting terminal (−) for receiving the error amplification signal Vcon. If the ramp signal Vramp is larger than the error amplification signal Vcon, the PWM comparator 231 generates a comparison result signal CC of a high level, and if the ramp signal Vramp is smaller than the error amplification signal Vcon, the PWM comparator 231 generates a comparison result signal CC of a low level. Accordingly, when the rising ramp signal Vramp reaches the error amplification signal Vcon, the comparison result signal CC of the high level is output at that point of time.

The inverter 236 receives an over-voltage protection signal OVP, and inverts it to generate an over-voltage protection signal /OVP.

The OR gate 232 receives the inverted over-voltage protection signal /OVP and the comparison result signal CC, and if any one of the two signal has a high level, outputs an OFF control signal FC of a high level. If the OFF control signal FC has a high level, a gate control signal Vgs for turning off the power switch 11 is generated.

If the zero current detection voltage Vzcd is an ON reference voltage or lower, the ON controller 233 generates an ON control signal NC for turning on the power switch 11. The ON control signal generator 232 generates an ON control signal NC having a high level pulse in synchronization with an ON control point of time at which the zero current detection voltage Vzcd that decreases after the turn-off of the power switch 11 is a reference voltage or lower.

The PWM flip-flop 234 generates a gate driver control signal VC for controlling the switching operation of the power switch 11 in response to the ON control signal NC and the OFF control signal FC. The PWM flip-flop 234 includes a set terminal S for receiving the ON control signal NC and a reset terminal R for receiving the OFF control signal FC. If a high level signal is input to the set terminal S, the PWM flip-flop 234 outputs a gate driver control signal VC of a high level through the output terminal Q. When a high level signal is input to the reset terminal R, the PWM flip-flop 234 outputs a gate driver control signal VC of a low level through the output terminal Q. If all of the signals input to the set terminal S and the reset terminal R have a low level, the PWM flip-flop 234 maintains the current gate driver control signal VC as it is.

The gate driver 235 generates a gate signal Vgs for switching the power switch 11 in response to a gate driver control signal VC. When a gate driver control signal VC of a high level is input, the gate driver 235 generates a gate signal Vgs of a high level for turning on the power switch 11, and when a gate driver control signal VC of a low level is input, the gate driver 235 generates a gate signal Vgs of a low level for turning off the power switch 11.

Figure 3:
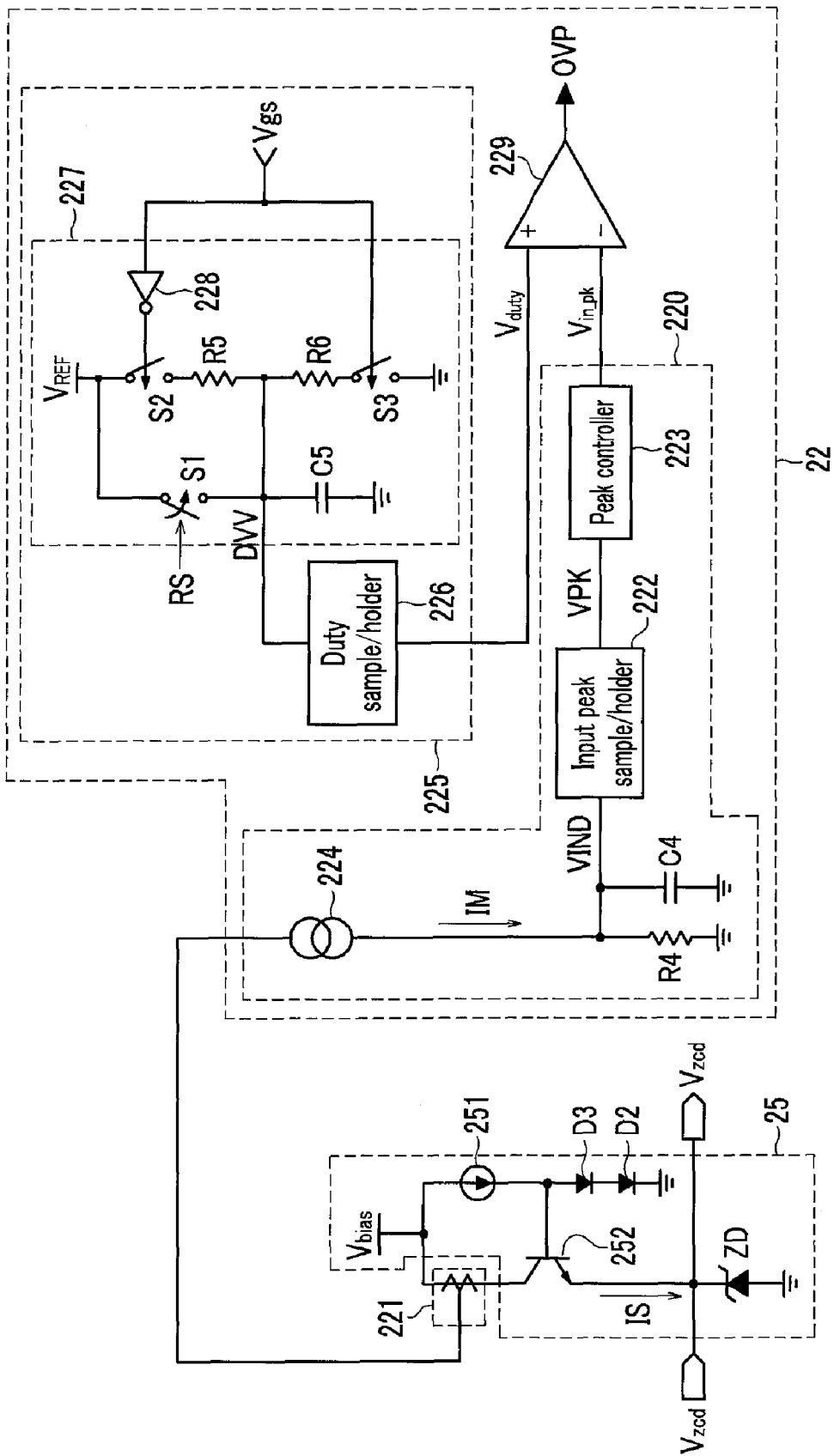
FIG. 3 is a view showing a clamping unit and an over-voltage protector according to an exemplary embodiment of the present invention.

Now, referring to FIG. 3, the clamping unit 25 and the over-voltage protector 22 according to an exemplary embodiment of the present invention will be described. FIG. 3 is a view showing the clamping unit 25 and the over-voltage protector 22 according to an exemplary embodiment of the present invention.

If the zero current detection voltage Vzcd is a negative voltage, the clamping unit 25 raises the zero current detection voltage Vzcd to a clamping voltage Vclamp. Concretely, the clamping unit 25 includes a constant current source 251, a bipolar junction transistor (BJT) 252, diodes D2 and D3 connected in series, and a Zener diode ZD. The constant current source 251 generates a constant current using a bias voltage Vbias, and causes a constant current to flow through the diode D2 and the diode D3. The collector of the BJT 252 is supplied with a bias voltage Vbias, and the base thereof is connected to the anode of the diode D2. Since the emitter of the BJT 252 is connected to the connection terminal CT1, a zero current detection voltage Vzcd is supplied to the emitter. The cathode of the Zener diode ZD is connected to the connection terminal CT1, and the anode thereof is grounded.

If a voltage difference between the base and emitter of the BJT 252 is a threshold voltage or higher, the BJT 252 is turned on. The diode D2 and the diode D3 are serially connected between the ground and the base of the BJT 252, and the voltage of the base is the sum of the threshold voltages of the two diodes D2 and D3. For instance, under the assumption that the threshold voltage of the diodes D2 and D3 is 0.7V, if the base voltage is 1.4V and the emitter voltage is 0.7V or lower, the BJT 252 is turned on. When the BJT 252 is turned on and a clamping current IS flows to the auxiliary inductor L2, the emitter voltage rises due to the resistor R2 and the clamping current IS. If the emitter voltage is greater than 0.7V, the BJT 252 is turned off and the clumping current IS does not flow. In this manner, even if the auxiliary voltage Vaux becomes a negative voltage, the zero current detection voltage Vzcd actually input to the power factor correction control circuit 2 by the clamping unit 25 is kept constant at the clamping voltage Vclamp, that is, 0.7V. 0.7V is a value having been set for convenience of description, and may be varied according to design. The number of diodes D2 and D3 connected in series is determined according to the clamping voltage Vclamp, and a serial diode string consisting of at least one diode is connected to the base of the BJT 252.

The clamping current IS is calculated by the following Equation 3. A value obtained by multiplying the input voltage Vin by the turn ratio Naux/Nin is the absolute value of the auxiliary voltage Vaux.

$$IS=((Naux/Nin)Vin+Vclamp)/R2 \square (Naux/Nin)Vin/R2 \square \square Vaux \square /R2 \quad \text{(Equation 3)}$$

The actual clamping voltage Vclamp is a very small value compared to the absolute value of the auxiliary voltage Vaux. As shown in Equation 3, the current flowing through the BJT 252 is determined according to the absolute value of the auxiliary voltage Vaux in order to maintain the zero current detection voltage Vzcd at the clamping voltage Vclamp. That is, the more negative the auxiliary voltage Vaux, the lower the emitter voltage of the BJT 252, thereby further increasing the clamping current IS. As a result, the higher the input voltage Vin, the larger the clamping current IS. Therefore, if the clamping current IS is found, the input voltage Vin can also be found.

The over-voltage protector 22 determines whether or not the output voltage Vout is an over-voltage by using the clamping current IS and duty information. The over-voltage protector 22 generates an input peak voltage Vin_pk corresponding to the peak of the input voltage Vin, generates a duty voltage Vduty corresponding to the duty information, and determines whether or not the output voltage Vout is an over-voltage according to a result of comparison between the two signals. The over-voltage protector 22 according to an exemplary embodiment of the present invention receives a gate control signal Vgs so as to obtain the duty information. However, the present invention is not limited thereto. Any one of the comparison result signal CC, the OFF control signal FC, the ON control signal NC, and the gate driver control signal VC may be used instead of the gate control signal Vgs.

Concretely, the over-voltage protector 22 includes an input peak voltage generator 220, a duty voltage generator 225, and a protection comparator 229. The input peak voltage generator 220 detects a clamping current IS, generates an input detection voltage VIND using the detected current, and samples and holds the peak of the input detection voltage VIND to generate an input peak voltage Vin_pk corresponding to the peak of the input voltage Vin. The duty voltage generator 225 receives a gate control signal Vgs containing duty information, generates a variable duty voltage DVV that increases or decreases in response to the gate control signal Vgs, and samples and holds the peak of the variable duty voltage DVV to generate a duty voltage Vduty having a voltage level corresponding to the duty. When the input voltage Vin is at the peak, the duty is the lowest. In the power factor correction circuit according to the present invention, the turn-on period of the power switch 11 is kept almost constant. In one cycle of an input alternating current power AC, the power factor correction circuit according to the present invention has a very low response speed with respect to the output voltage of an error amplification signal Vcon. Thus, the error amplification signal Vcon is constant during at least one cycle of an input alternating current AC. A point of time when the power switch 11 is turned off is determined by comparing the ramp signal Vramp having a predetermined rising slope and the error amplification signal Vcon. Therefore, the turn-on period of the power switch 11 is kept constant. The turn-off period of the power switch 11 is determined according to the both-end voltage of the inductor L1, and when the power switch 11 is in an OFF state, the both-end voltage of the inductor L1 is a voltage Vout-Vin obtained by subtracting an input voltage from an output voltage. Since the output voltage Vout is controlled to be constant, the both-end voltage of the inductor is the lowest when the input voltage Vin is at the peak. At this time, the falling slope of the inductor current IL is the smallest, and the turn-off period of the power switch is the longest. The duty is the ratio of the turn-on period of the power switch 11 to the turn-off period thereof. Since the turn-off period is the longest and the turn-on period is kept constant when the input voltage is at the peak, the duty is the lowest when the input voltage Vin is at the peak. The over-voltage protector 22 according to an exemplary embodiment of the present invention controls such that the variable duty voltage DVV is at the peak when the duty is the lowest. Accordingly, the variable duty voltage DVV increases or decreases according to (1-duty). A concrete description will be given later.

The input voltage peak generator 220 includes a current detector 221, an input peak sample/holder 222, a peak adjuster 223, a current mirror 224, a resistor R3, and a capacitor C4.

The current detector 221 detects a clamping current IS and delivers the detected current to the current mirror 224.

The current mirror 224 mirrors the detected current to generate a mirror current IM. One end of the resistor R3 is connected to the output end of the current mirror 224, the mirror current IM flows through the resistor R3, and the voltage of one end of the resistor R3 becomes an input detection voltage VIND. The capacitor C4 is a low-band pass filter, and is connected in parallel to the resistor R3 to eliminate noise of the input detection voltage VIND.

The input peak sample/holder 222 samples and holds the peak of the input detection voltage VIND in a cycle of the input detection voltage VIND to generate a peak voltage VPK. The input peak sample/holder 222 samples the peak of a cycle of the input detection voltage VIND, and holds the sampled peak voltage VPK before sampling the peak of the next cycle.

Figure 4:
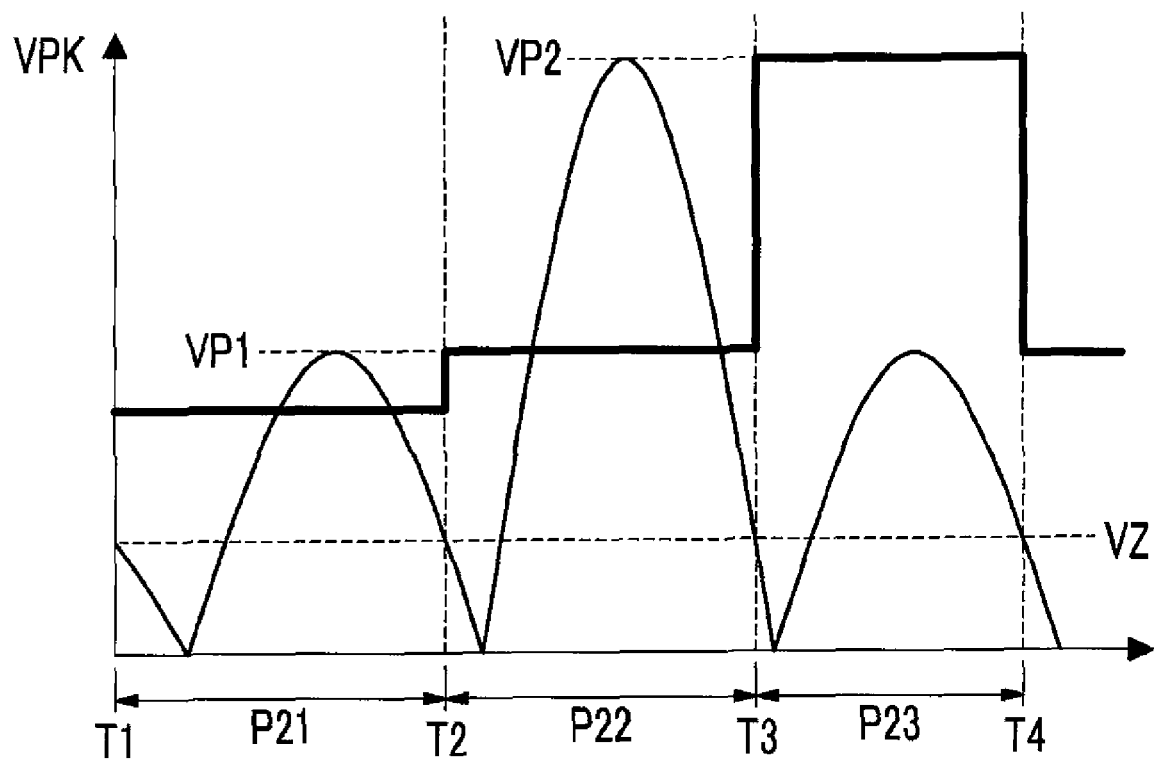
FIG. 4 is a view showing the relationship between an input detection voltage VIND and a peak voltage VPK.

FIG. 4 is a view showing the relationship between the input detection voltage VIND and the peak voltage VPK. In FIG. 4, the peak voltage VPK is indicated by a thick solid line, and the input detection voltage VIND is indicated by a thin solid line.

In an exemplary embodiment of the present invention, when the power switch 11 is in an ON state, the auxiliary voltage is lower than the clamping voltage, and when the power switch 11 is in an OFF state, the auxiliary voltage is higher than the clamping voltage.

As the mirror current IM flows during the turn-on period of the power switch 11, the input detection voltage VIND increases. As the mirror current IM does not flow during the turn-off period of the power switch 11, the input detection voltage VIND decreases. Therefore, the input detection voltage VIND has the same cycle as the switching cycle of the power switch 11.

In FIG. 4, a predetermined reference voltage VZ is a voltage for detecting a point at which the input detection voltage VIND is the ground voltage, and is very close to the ground voltage. Since the input detection voltage VIND is produced in synchronization with the input voltage Vin, times T1, T2, T3, and T4 are time points at which the input voltage Vin crosses zero.

As shown in FIG. 4, since the time T2, the input peak sample/holder 222 holds the highest peak voltage VP1 among the voltages sampled during the period from the time T1 to the time T2 when the input detection voltage VIND decreases to a reference voltage VZ. Likewise, since the time T3, the input peak sample/holder 222 holds the highest peak voltage VP2 among the voltages sampled during the period from the time T2 to the time T3.

Concretely, the input peak sample/holder 222 regards the period between two points of time at which the input detection voltage VIND is constant at a voltage higher than the reference voltage VZ as one cycle. That is, the input peak sample/holder 222 regards the period from the time T1 to the next time T2 as one cycle, samples the highest voltage VP1 during a cycle P21, and holds the voltage VP1 as the peak voltage VPK during the next cycle P22. In this manner, the highest voltage VP2 during the cycle P22 becomes the peak voltage VPK of the next cycle P23.

The peak adjuster 223 adjusts the peak voltage VPK according to a predetermined gain to generate an input peak voltage Vin_pk. The gain of the peak adjuster 223 is determined by the ratio between the peak voltage VPK corresponding to the peak of the input voltage Vin and a duty voltage Vduty obtained when the output voltage Vout is a reference voltage of over-voltage detection. As for the reference voltage for over-voltage detection, if the output voltage Vout is higher than this reference voltage, the output voltage Vout is determined as an over-voltage. The reference voltage of over-voltage detection is hereinafter referred to as an over-voltage reference voltage. Concretely, when the input voltage Vin is at the peak, the clamping current IS is also at the peak, and the input detection voltage VIND is also at the peak. A concrete example of gain generation will be described after the description of the duty voltage generator 225.

The duty voltage generator 225 includes a duty sample/holder 226 and a variable duty voltage generator 227. The variable duty voltage generator 227 generates a variable duty voltage DVV in response to a gate control signal Vgs. The variable duty voltage generator 227 includes an inverter 228, a reset switch S1, a duty charge switch S2, a duty discharge switch S3, two resistors R4 and R5, and a duty capacitor C5. The inverter 228 includes an input terminal to which a gate control signal Vgs is input and an output terminal to which a signal for controlling the switching operation of the duty charge switch S2 is output, and inverts and outputs the gate control signal Vgs. The duty charge switch S2 includes one end for receiving a duty reference voltage Vref and the other end connected to one end of the resistor R4. The other end of the resistor R4 is connected to one end of the resistor R5, and the other end of the resistor R5 is connected to one end of the duty charge switch S3. The other end of the duty charge switch S3 is grounded, and the duty charge switch S3 performs a switching operation in response to the gate control signal Vgs. One end of the reset switch S3 is connected to the other end of the resistor R4, one end of the resistor R5, and one end of the duty capacitor C5, and the other end thereof is supplied with the duty reference voltage Vref. The other end of the capacitor C5 is grounded, and the voltage of one end of the duty capacitor C5 becomes the variable duty voltage DVV. Concretely, the duty charge switch S2 is turned on by a gate control signal of a low level, and the duty discharge switch S3 is turned on by a gate control signal of a high level.

Therefore, while the gate control signal Vgs has a high level, that is, the power switch 11 is in the ON state, the duty discharge switch S3 is in the ON state and the duty capacitor C5 is discharged. Then, the variable duty voltage DVV decreases. While the gate control signal Vgs has a low level, that is, the power switch 11 is in the ON state, the duty charge switch S32 is in the ON state and the duty capacitor C5 is charged. Then, the variable duty voltage DVV increases. The reset switch S1 performs a switching operation by a reset signal RS, and when the reset switch S1 is turned on, the variable duty voltage DVV becomes the reference voltage Vref. The reset signal RS has a level for turning on the switch S1 when the power factor correction controller 2 does not operate because a power supply voltage required to normally operate the power factor correction controller 2 drops to a certain voltage or less.

The duty sample/holder 226 identifies the peak of the variable duty voltage DVV in a cycle of the variable duty voltage DVV, samples the peak of the variable duty voltage DVV of the current cycle, and holds it for the next cycle to generate a duty voltage Vduty. The method thereof is the same as in FIG. 4. When the switch S1 is turned on by the reset signal RS, the duty sample/holder 226 outputs the reference voltage Vref as the duty voltage Vduty. Since the reference voltage Vref always has a higher value than the input peak voltage Vin_pk, the over-voltage protection signal OVP is maintained at a high level.

The protection comparator 229 includes a non-inverting terminal (+) for receiving the duty voltage Vduty and an inverting terminal (−) for receiving the input peak voltage Vin_pk. If the duty voltage Vduty is higher than the input peak voltage Vin_pk, a high level signal is output, and if the duty voltage Vduty is lower than the input peak voltage Vin_pk, a low level signal is output. The over-voltage protection signal OVP according to an exemplary embodiment of the present invention has a low level in an over-voltage state, and has a high level in a normal voltage state.

Hereinafter, a method for setting a gain in the peak adjuster 223 of the over-voltage protector 22 according to an exemplary embodiment of the present invention will be described.

Now, for convenience of description, it is assumed that the turn ratio Naux/Nin between the inductor L1 and the auxiliary inductor L2 is 1:10, the resistor R3 is 80 Kohm, the resistor R4 is 63 Kohm, the reference voltage Vref is 4V, and the current mirror 224 mirrors the current detected by the current detector 221 at a ratio of 1:10. Also, it is assumed that the AC voltage input to the power factor correction circuit 1 is 265 VAC and the output voltage Vout is 390 VDC. If the input AC voltage is 265 VDC, the peak of the input voltage Vin is 265 √2.

As the clamping current IS is calculated as in Equation 3, the peak IS-pk of the clamping current is reached when the input voltage Vin has a peak value. This is calculated as in the following Equation 4.

$$IS\_pk = \frac{\left(\frac{1}{10} 265\sqrt{2} + 0.7\right)}{80000} = 477.2 uA \quad \text{(Equation 4)}$$

Then, a mirror current IM output from the current mirror 224 is 47.72 uA, and when this mirror current IM flows through the resistor R34, the input detection voltage VIND is 3V. This value is the peak of the input detection voltage VIND, so the peak voltage VPK is 3V.

When the gate control signal Vgs has a low level, the variable duty voltage DVV increases. Thus, the variable duty voltage DVV is determined by multiplying the reference voltage Vref by (1-duty). (1-duty) is determined by dividing the input voltage Vin by the output voltage Vout. Thus, the variable duty voltage DVV is calculated as in the following Equation 5.

$$DVV = Vref(1\text{-duty}) = Vref(Vin/Vout) \quad \text{(Equation 5)}$$

Then, the variable duty voltage is a value obtained by multiplying the duty reference voltage Vref by (1-duty), where (1-duty) is a value obtained by dividing the input voltage Vin by the output voltage Vout, and the output voltage Vout is controlled to be constant in the normal state. Therefore, the peak of the variable duty voltage DVV is, the duty voltage Vduty, and the variable duty voltage DVV reaches the peak when the input voltage Vin is at the peak. Thus, the duty voltage Vduty becomes 3.84V.

As can be seen from Equation 5, the higher the output voltage Vout, the lower the duty voltage Vduty. Thus, if an over-voltage is generated, the duty voltage Vduty decreases. An exemplary embodiment of the present invention employs such a relationship among the duty voltage Vduty, the output voltage Vout, and the input voltage Vin. Therefore, the gain of the peak adjuster 223 is set to a value for adjusting the peak voltage VPK such that, when the output voltage Vout is an over-voltage reference voltage, the input peak voltage Vin_pk is the same as the duty voltage Vduty.

If the over-voltage reference voltage is set to 450 VDC, the duty voltage Vduty is 3.33V. As the peak voltage VPK is calculated to be 3V, the gain of the peak adjuster 223 can be set to 1.11 (3.33/3). Moreover, if the over-voltage reference voltage is set to 500 VDC, the duty voltage Vduty is 3V and the gain of the peak adjuster 223 can be set to 1 (3/3). That is, the gain of the peak adjuster 223 is properly adjusted depending on what value the over-voltage reference voltage is set to.

In this manner, the over-voltage protector 22 according to an exemplary embodiment of the present invention uses the input peak voltage Vin_pk corresponding to the peak of the input voltage Vin and the duty voltage Vduty corresponding to the duty.

The duty is determined by the input voltage and the output voltage Vout, and the input voltage and the duty voltage Vduty corresponding to the duty can be found. Therefore, the output voltage Vout can be estimated. Accordingly, the power factor correction circuit and the driving method thereof according to an exemplary embodiment of the present invention do not require direct detection of the output voltage Vout to determine whether or not the output voltage Vout is an over-voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power factor correction circuit comprising:
    an inductor for receiving an input voltage and supplying output power;
    a power switch connected to the inductor to control an inductor current flowing through the inductor;
    an auxiliary inductor coupled to the inductor with a predetermined turn ratio; and
    a power factor correction control circuit that controls the output power by controlling the switching operation of the power switch and determines whether or not the output voltage of the output power is an over-voltage,
    wherein the power factor correction control circuit comprises an over-voltage protector that generates an input peak voltage corresponding to the peak of the input voltage by using a clamping current for maintaining a zero current detection voltage corresponding to an auxiliary voltage, which is a both-end voltage of the auxiliary inductor, at a predetermined clamping voltage, generates a duty voltage corresponding to the duty of the power switch, and determines whether or not the output voltage is an over-voltage according to a result of comparison between the input peak voltage and the duty voltage.

2. The power factor correction circuit of claim 1, wherein the power factor correction controller generates the input peak voltage by using the clamping current obtained during the turn-on period of the power switch.

3. The power factor correction circuit of claim 2, wherein the over-voltage protector comprises:
    an input peak voltage generator that generates an input detection voltage corresponding to the clamping current, samples and holds the peak of the input detection voltage in a cycle of the input detection voltage, and adjusts the held peak voltage according to a predetermined gain to generate the input peak voltage;

a duty voltage generator that receives a predetermined control signal for controlling the duty, generates a variable duty voltage that increases or decreases in response to the control signal, and samples and holds the peak of the variable duty voltage to generate the held voltage as the duty voltage; and a protection comparator that comprises a first input terminal for receiving the input peak voltage and a second input terminal for receiving the duty voltage and generates an over-voltage protection signal according to a result of comparison between the input peak voltage and the duty voltage.

4. The power factor correction circuit of claim 3, wherein the input peak voltage generator comprises:

a current detector for detecting the clamping current;

a current mirror for mirroring the detected current and generating a mirror current;

a resistor through which the mirror current flows to produce the input detection voltage;

an input peak sample/holder for sampling and holding the peak of the input detection voltage in a cycle of the input detection voltage to generate the peak voltage; and a peak adjuster for adjusting the peak voltage according to the gain to generate an input peak voltage.

5. The power factor correction circuit of claim 4, wherein the gain is determined by the ratio between an input detection voltage obtained when the input voltage is at the peak and a duty voltage obtained when the output voltage is a reference voltage of over-voltage detection.

6. The power factor correction circuit of claim 3, wherein the duty voltage generator comprises:

a variable duty voltage generator that comprises a duty capacitor and generates the variable duty voltage by discharging the duty capacitor in response to a control signal for turning on the power switch and charging the duty capacitor in response to a control signal for turning off the power switch; and a duty sample/holder for sampling and holding the peak of the variable duty voltage in a cycle of the control signal to generate the duty voltage.

7. The power factor correction circuit of claim 6, wherein the variable duty voltage generator comprises:

a first resistor with one end connected to one end of the duty capacitor;

a duty charge switch with one end connected to the other end of the first resistor and the other end supplied with a predetermined reference voltage;

a second resistor with one end connected to one end of the duty capacitor;

a duty discharge switch with one end connected to the other end of the second resistor and the other end being grounded;

an inverter for receiving the control signal and inverting and outputting the control signal; and a reset switch with one end connected to one end of the duty capacitor and the other end receiving the reference voltage, wherein the duty discharge switch performs a switching operation in response to the control signal and the duty charge switch performs a switching operation in response to the inverted control signal.

8. The power factor correction circuit of claim 3, wherein the power factor correction controller further comprises a PWM controller that turns on the power switch if the zero current detection voltage is lower than a predetermined reference voltage, and turns off the power switch according to a result of comparison between an error amplification signal corresponding to the output voltage and a ramp signal that increases at a constant slope during the turn-on period of the power switch.

9. The power factor correction circuit of claim 8, wherein the PWM controller comprises:

a PWM comparator for comparing the error amplification signal and the ramp signal and generating a comparison result signal according to a result of the comparison;

a logical operator for generating an OFF control signal in response to the comparison result signal and the over-voltage protection signal;

an ON controller for generating an ON control signal if the zero current detection voltage is the reference voltage or lower;

a PWM flip-flop that comprises a set terminal for receiving the ON control signal and a reset terminal for receiving the OFF control signal, and generates a gate driver control signal of a first level for turning on the power switch in response to the ON control signal and a gate driver control signal of a second level for turning off the power switch in response to the OFF control signal; and a gate driver that generates a gate control signal for switching the power switch in response to the gate driver control signal.

10. The power factor correction circuit of claim 9, wherein the duty voltage generator receives any one of the ON control signal, the OFF control signal, and the gate driver control signal instead of the gate control signal, and generates a variable duty voltage.

11. The power factor correction circuit of claim 10, wherein the logical operator receives an inverted signal of the over-voltage protection signal and the comparison result signal and generates the OFF control signal by performing an OR operation.

12. The power factor correction circuit of claim 8, wherein the power factor correction circuit further comprises an error amplifier for amplifying the difference between a predetermined error reference voltage and a division voltage obtained by resistor-dividing the output voltage to generate the error amplification signal.

13. The power factor correction circuit of claim 8, further comprising a ramp signal generator comprising:

a constant current source for generating a constant current;

a charge switch with one end connected to the constant current source;

a capacitor with one end connected to the other end of the charge switch and the other end being grounded; and a discharge switch connected in parallel to the capacitor, wherein the charge switch is turned on during the turn-on period of the power switch, the discharge switch is turned off during the turn-off period of the power switch, and the ramp signal is the voltage of one end of the capacitor.

14. The power factor correction circuit of claim 1, wherein the power factor correction controller further comprises:

a transistor comprising an emitter for receiving the zero current detection voltage and a collector to which a bias voltage is applied;

a serial diode string comprising at least one diode disposed between the base of the transistor and the ground; and a clamping unit comprising a constant current source for supplying a constant current to the serial diode string, wherein the clamping current is a current flowing through the transistor.

15. The power factor correction circuit of claim 14, wherein the serial diode string comprises diodes of a number determined according to the clamping voltage.

16. The power factor correction circuit of claim 14, wherein the over-voltage protector comprises:

an input peak voltage generator that generates an input detection voltage corresponding to the clamping current, samples and holds the peak of the input detection voltage in a cycle of the input detection voltage, and adjusts the held peak voltage according to a predetermined gain to generate the input peak voltage;

a duty voltage generator that receives a predetermined control signal for controlling the duty, generates a variable duty voltage that increases or decreases in response to the control signal, and samples and holds the peak of the variable duty voltage to generate the held voltage as the duty voltage; and a protection comparator that comprises a first input terminal for receiving the input peak voltage and a second input terminal for receiving the duty voltage and generates an over-voltage protection signal according to a result of comparison between the input peak voltage and the duty voltage.

17. A driving method of a power factor correction circuit, comprising: an inductor for receiving an input voltage and supplying an output power; a power switch connected to the inductor to control an inductor current flowing through the inductor; and an auxiliary inductor coupled to the inductor with a predetermined turn ratio, the method comprising:

detecting a clamping current for maintaining a zero current detection voltage corresponding to an auxiliary voltage, which is the both-end voltage of the auxiliary inductor, at a predetermined clamping voltage;

generating an input peak voltage corresponding to the peak of the input voltage by using the detected clamping current;

generating a duty voltage corresponding to the duty of the power switch; and determining whether or not the output voltage is an over-voltage according to a result of comparison between the input peak voltage and the duty voltage.

18. The method of claim 17, wherein the detecting of the clamping current is performed during the turn-on period of the power switch.

19. The method of claim 18, wherein the generating of the input peak voltage comprises:

generating an input detection voltage corresponding to the clamping current;

sampling and holding the peak of the input detection voltage in a cycle of the input detection voltage; and adjusting the held peak voltage according to a predetermined gain to generate the input peak voltage.

20. The method of claim 19, wherein the gain is determined by the ratio between an input detection voltage obtained when the input voltage is at the peak and a duty voltage obtained when the output voltage is a reference voltage of over-voltage detection.

21. The method of claim 18, wherein the generating of the duty voltage comprises:

receiving a predetermined control signal for controlling the duty and generating a variable duty voltage that increases or decreases in response to the control signal; and sampling and holding the peak of the variable duty voltage to generate the held voltage as the duty voltage.

* * * * *